United States Patent
Walraven et al.

[15] 3,695,500
[45] Oct. 3, 1972

[54] CONTRA-RESONANT ANVIL

[72] Inventors: Thomas A. Walraven; Nicholas Maropis; both of West Chester; William C. Elmore, Swarthmore; Janet Devine, West Chester, all of Pa.

[73] Assignee: Aeroprojects Incorporated, West Chester, Pa.

[22] Filed: June 1, 1970

[21] Appl. No.: 42,518

Related U.S. Application Data

[63] Continuation-in-part of Ser. No. 717,295, March 29, 1968, abandoned.

[52] U.S. Cl. ..................228/1, 29/470.1, 310/25
[51] Int. Cl. ...........................B23k 1/06, B23k 5/20
[58] Field of Search.............74/1, 1 R, 1 SS; 228/1; 29/470.1; 156/73; 310/25, 26

[56] References Cited

UNITED STATES PATENTS

| | | | |
|---|---|---|---|
| 3,184,841 | 5/1965 | Jones et al. | 29/470 |
| 3,257,721 | 6/1966 | Jones | 29/470.1 |
| 3,341,935 | 9/1967 | Balamuth | 29/470 |

*Primary Examiner*—John F. Campbell
*Assistant Examiner*—R. J. Craig
*Attorney*—Seidel, Gonda & Goldhammer

[57] ABSTRACT

Apparatus and method are disclosed for welding metal members by means of vibratory energy. Reliability of such welding apparatus is improved by provision of an anvil designed for regulated response to excitation by an ultrasonically-powered sonotrode. The anvil is mounted in an assembly which contributes appropriate support, restraint and isolation.

8 Claims, 3 Drawing Figures

PATENTED OCT 3 1972 3,695,500

CONTRA-RESONANT ANVIL

This application is a continuation-in-part of our copending application Ser. No. 717,295 filed Mar. 29, 1968 now abandoned.

Vibratory welding process and apparatus have been described in U.S. Pat. No. 2,946,119 entitled "Method and Apparatus Employing Vibratory Energy for Bonding Metals" issued July 26, 1960, in the names of James Byron Jones William C. Elmore and Carmine F. DePrisco. The disclosures in said patent are incorporated into the subject patent application and made a part hereof.

Ultrasonic welding in accordance with the present invention may be effected under the conditions generally developed and set forth in the above-identified patent. As described therein, the materials to be welded are clamped in the welding machine between a transducer-driven sonotrode and an opposing member, or anvil. The two workpiece surfaces to be joined are clamped together at the intended weld zone with a static force sufficient to hold the pieces together and assure that vibration delivered by the transducer-driven sonotrode will produce welds resulting from the cyclic stresses in the weld zone.

It will be understood by those familiar with ultrasonic welding that if the microdisplacements and interfacial stresses associated with welding are maximum, then energy delivery to the weld locale will be maximum. The sonotrode-opposing, work-supporting member, hereinafter referred to as the anvil, is significantly involved with the capability of the welding apparatus to deliver power to the weldment locale and produce superior welds with minimum power.

Reliability and reproducibility of performance of vibratory welding equipment has occasionally been hampered by anvil difficulties. Varying performance has sometimes been attributed to the supporting structures of anvils, to their attachments to the primary structures of the welding machine, and to varying elastic compliance of the anvils themselves.

The need for designable anvils with predictable characteristics has been increasingly evident as equipment of greater precision, higher power, or otherwise generally improved capability has been developed and utilized in production. Anvil problems during pre-shipment performance checkout of ultrasonic welding machines have sometimes consumed excessive time and been reflected in increased equipment cost. Yet as far as is known, no completely practical, design-optimizable, non-powered anvil apparatus and/or method have heretofore been developed as a solution to the above-described ultrasonic welding machine problems.

Consideration of ultrasonic welding has led to an accepted view that, for best welding performance, the amplitude of the sonotrode tip should be maximum under the power delivery conditions of welding. Regarding desirable function of the anvil, two views have been prevalent — one, that the anvil should preferably be subject to powered vibratory excursions which are out-of-phase with the vibratory excursions of the sonotrode tip, and the second, that when a powered anvil could not be provided, the anvil should be generally passive, i.e., non-compliant or "dead-beat."

It has long been known that ultrasonic welding can be enhanced by out-of-phase excursioning in both the sonotrode tip and the anvil, a condition which can be accomplished by appropriately powering the anvil member as well as the sonotrode. The power-driven anvil approach, however, requires an additional transducer-coupling device and is therefore complicated and more costly; practicality usually prescribes use of systems wherein power delivery to the work is by one powered sonotrode only.

As to the acoustic reaction of non-powered anvils, a generally-held belief has been that maximum welding effect was realizable when the anvil was, as stated above, virtually passive in response to vibratory forces imposed by the sonotrode tip. Following this approach, effort has from time to time been expended toward maximizing the passive, or "dead-beat" characteristics of ultrasonic welding anvils and their supports. Although it was recognized during these efforts that the anvil would necessarily be elastic within the normal range of its material properties, the potential role of the natural elastic vibration of the anvil has heretofore not been adequately understood.

The present invention is based on the discovery that essentially passive or "dead-beat" anvils do not produce optimized welding machine performance, as evaluated by thicknesses of materials successfully welded and the power-time relationship needed for welding same. It has observed, on the contrary, that substantially improved welding performance can be effected when the anvil vibrates, and with considerable intensity, during the accomplishment of an ultrasonic weld. It was since postulated that the enhanced welding effect is derived from periods of out-of-phase excursion of the anvil tip with reference to the excursions of the sonotrode tip during the interval used to accomplish a vibratory weld — a circumstance intermittently resembling that which occurs continuously when both the anvil and sonotrode are powered, as hereinabove discussed. It was further postulated that the elastic compliance of the anvil is related to a vibratory response of the anvil to the excitation by the sonotrode.

Frequency response in resonant anvils has been considered previously — for instance, it has been shown that when the anvil response to the sonotrode's vibration occurs at the same frequency as the operating frequency of the powered transducer-coupling system, or in overtones thereof, welder performance is adversely affected. This effect has been acknowledged previously, as in the hereinabove referenced U.S. Pat. No. 2,946,119, but elimination of adverse anvil performance in a specific welding machine has generally involved only experimental adjustments of anvil dimensions.

Investigation and analysis associated with the present invention revealed that much improved reproducibility of welding performance as well as actually stronger welds are accomplished when the anvil has a resonant frequency somewhat above, or somewhat below, the operating frequency of the powered transducer-coupling-sonotrode system of the vibratory welding machine.

It was further observed that an anvil of desired contra-resonant characteristics presents a high driving impedance at the operating frequency of the transducer-coupling system, and that impedance values could be employed in dimensioning the anvil for regulated response within a range of acceptable frequencies.

Thus the object of the present invention is to provide novel anvil apparatus and method of using the same in ultrasonic welding.

It is another object to provide ultrasonic anvil apparatus and method wherein a non-powered anvil reed is subject to excursions which are out-of-phase with excursions of the welding sonotrode over a substantial portion of the welding interval.

It is another object to provide a novel anvil which can be acoustically designed to overcome problems encountered heretofore in the performance of an ultrasonic welder.

It is another object to provide a novel reactive element for use in an ultrasonic apparatus such that said element is induced to vibration by and out of phase with an exciting member or members of said apparatus during a significant portion of the interval of applied vibration.

Other objects appear hereinafter.

There is shown in the drawings an embodiment of a vibratory anvil apparatus which exmplifies the present invention. It must be understood that the invention is not limited to the embodiment here presented or to the precise arrangement and instrumentalities shown.

Having these qualifications in mind and referring to the schematic drawings wherein like reference characters refer to like parts:

Figure 1:
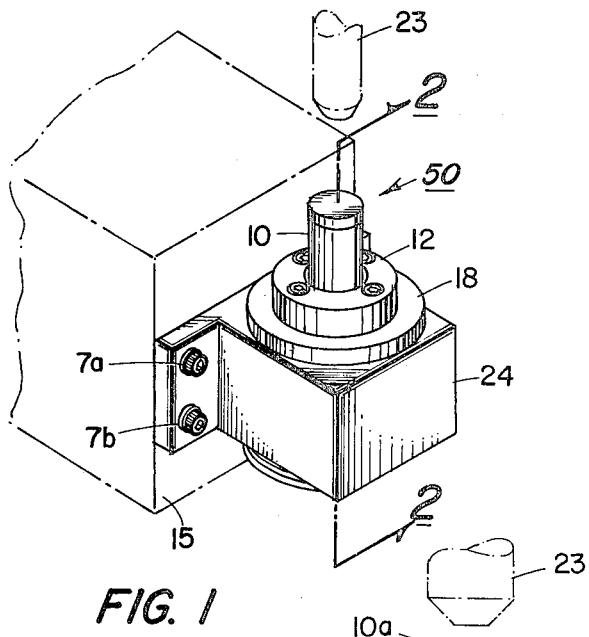
FIG. 1 is a perspective view of an exemplary anvil apparatus designed for use with an ultrasonic welding machine in accordance with the present invention.
Figure 2:
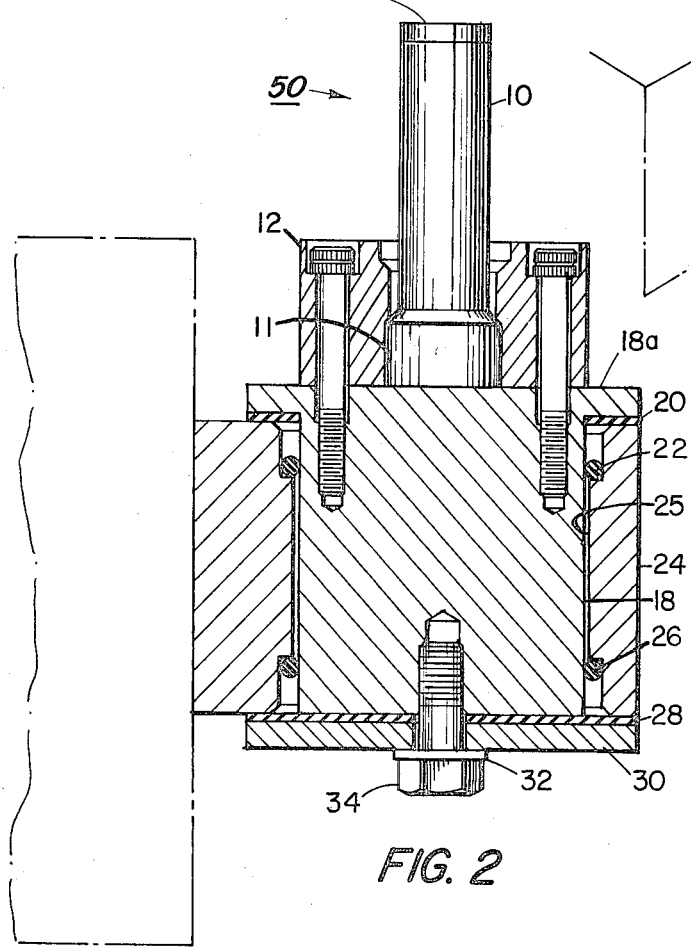
FIG. 2 is a sectional view of the apparatus taken across line 2—2 of FIG. 1.
Figure 3:
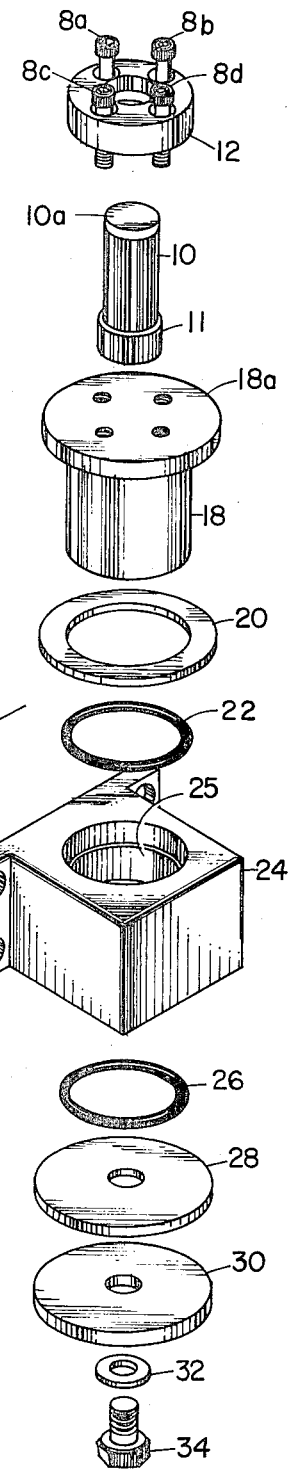
FIG. 3 is an exploded perspective view of the components of the apparatus depicted in FIGS. 1 and 2.

Referring conjointly to FIGS. 1, 2 and 3, all of which portray an anvil apparatus designated as 50, it should be initially understood that fixed-free reflective anvil 10 is the critical member of apparatus 50 and that its design characteristics establish general requirements for other members of an effective assembly. Anvil reed 10 and base ring 12 to which it is attached most fundamentally embody the novel reciprocal function of apparatus 50 with a cooperating ultrasonic welding machine. Otherwise apparatus 50 is comprised of various mechanical elements which serve as practical hardware for the support, restraint, and isolation required to assure the function of apparatus 50 in accordance with the present invention.

Referring now to the drawings in detail, in FIG. 1 the anvil reed 10 is shown assembled into a work support apparatus of a type characteristically employed with ultrasonic welding machines. Readily identifiable components in the FIG. 1 perspective view include anvil 10 which is shown attached into base ring 12 which restrains anvil 10. Anvil 10 and ring 12 are preferably metallurgically attached as by brazing. The assembly of anvil 10 and ring 12 may be removably attached to flange 18a of a support mass 18 by means of bolts such as 8a, 8b, 8c and 8d. An isolated support mass 18 may be housed within the bore of block support member 24 which is shown mechanically attached to the frame 15 of the welding machine by bolts 7a and 7b which penetrate the frame 15.

Structural details may be more completely identified by considering conjointly FIGS. 2 and 3. Anvil 10 preferably includes a hardened work-contacting face member 10a which may either be screw-attached or preferably metallurgically attached as by brazing to anvil 10. When utilized as a detachable element, the hardened tip 10a is included as an integral part of anvil 10 in calculations pertinent to overall anvil design.

The base portion of anvil 10 is preferably metallurgically bonded, as by brazing, at jointure interface 11, into base ring 12. The function of ring 12 is to support and provide a degree of clamping action on anvil 10 which will assure a desired vibratory condition of anvil 10 as it vigorously contra-resonates in response to applied forces from the active sonotrode 23 of a welder.

A series of elastomeric gasket-like components having as their purpose the prevention of metallic contact between the support mass 18 and block support 24 are shown. Top isolator gasket 20 is interposed at the interface between flange 18a and block support 24. Anvil support 24 may be grooved circumferentially at an upper and lower location of the bore 25 for retention of upper and lower O-ring elastomeric isolators 22 and 26 which serve to prevent metal contact between wall areas of mass 18 and block support 24 and thereby acoustically isolate mass 18 from support 24. Bottom elastomeric disk 28 acoustically isolates the support 24 from steel clamping plate 30.

Mass 18 is retained in block support 24 by the bolt 34. Bolt 34 extends through washer 32, clamping plate 30 and elastomeric disk 28 into a tapped hole in mass 18. It will be seen that tightening of bolt 34 will have the effect of drawing the flanged mass 18 down toward block support 24. Elastomeric member 20 acoustically isolates flange 18a and support 24.

It will be noted that sonotrode 23, anvil 10, ring 12 and mass 18 are shown to be coaxial, but such coaxial arrangement is not mandatory; moreover, it should be clearly understood that the anvil of the present invention is altogether useful and effective with the several embodiments of ultrasonic welding apparatus depicted in FIGS. 1, 3, 6, and 8 of U.S. Pat. No. 2,946,119.

It has been stated hereinabove that anvil 10 is the critical member of apparatus 50 and that its design characteristics establish design requirements for other members of the assembly. The general method for dimensioning an anvil reed for appropriate contra-resonance includes the steps of (1) calculating anvil impedance as related to elastic compliance factors, viz., transverse stiffness and base rigidity, (2) integrating the aforesaid calculations with additional impedance calculations relating to anvil reflectivity of vibrations, and (3) translating the above impedance calculations into anvil dimensions productive of a frequency response in the anvil which will be out-of-phase with that of the cooperating sonotrode during a substantial portion of the weld cycle.

The design of the contra-resonant or high-impedance anvil reed 10 is based upon the operating frequency and acoustic power capability of the welder. If a flexural contra-resonant frequency response is desired in anvil reed 10 (as, for example, for use in an ultrasonic apparatus which delivers vibratory energy in the shear mode, the length of the anvil reed is determined by the equation:

$$L \text{ } \alpha \text{ } \sqrt{K c_o/\omega} \quad (1)$$

wherein $L$ is the length of anvil reed 10 in inches, $K$ is the radius of gyration $r/2$ of the anvil reed section, $\omega$ is the angular frequency, $2\pi f$ and $f$ is the operating frequency of the welder, $c_o$ is the velocity of sound in the anvil reed 10, and $\alpha$ is a function of impedance and can be determined from the roots of the transcendental equation:

$$\tanh \alpha - \tan \alpha = 0 \quad (2)$$

Solution of equation (2) and substitution in equation (1) defines the contra-resonant or high-impedance characteristics for the anvil reed 10. Suitable roots of this equation are $\alpha_1 \cong 5\pi/4$, $\alpha_2 \cong 9\pi/4$, and $\alpha_3 \cong 13\pi/4$; etc.

The anvil 10 described above relates to an anvil which is designed to respond in flexure. The concepts of the present invention are equally applicable to anvils which respond either axially (longitudinally) or torionsally.

If an axial contra-resonant frequency response is desired in anvil reed 10 (as, for example, for use in an ultrasonic apparatus which delivers vibratory energy in the axial, or longitudinal mode), the length of said anvil reed is determined by the equation:

$$L = \alpha (C_o/\omega) \quad (3)$$

wherein $L$ is the length of the anvil 10 in inches, $c_o$ is the longitudinal velocity of the sound in the anvil reed, $\omega$ is the angular frequency $2\pi f$ and $f$ is the operating frequency of the welder, and $\alpha$ is a function of impedance and can be determined from the roots of the transcendental equation:

$$c_o + \alpha = 0 \quad (4)$$

Suitable roots of the equation are $\alpha = \pi/2, 3\pi/2, 5\pi/2, 7\pi/2$, etc.

If a torsional contra-resonant frequency response is desired in anvil reed 10 (as, for example, for use in an ultrasonic apparatus which delivers vibratory energy in the torsional mode), the length of said anvil reed would be determined by the equation:

$$L = \alpha(c_{shear}/\omega) \quad (5)$$

where $L$ is the length of the anvil in inches, $\omega$ is the angular frequency $2\pi f$ and $f$ is the operating frequency of the welder, $c_{shear}$ is the shear velocity of sound in the anvil, and $\alpha$ is a function of impedance and can be determined from the roots of the transcendental equation:

$$\cot \alpha = 0 \quad (6)$$

Suitable roots of this equation are: $\alpha = \pi/2, 3\pi/2, 5\pi/2, 7\pi/2$, etc. Solution of equation (6) and substitution in equation (5) defines the contra-resonant or high impedance characteristics for the anvil reed 10 operating in the torsional mode.

It will be recognized by those skilled in the art that an anvil reed designed according to the foregoing equations will have an effective length somewhat greater than its physical length due to non-ideal boundary conditions, particularly compliance at its fixed end. However, since the foregoing equations are well known, it is expedient to use these equations for reproducibly designing anvil reeds, but in practice it may be necessary to modify the length somewhat to achieve the desired characteristics of moderately high impedance and amplitude which yield optimum performance.

The diameter for each anvil reed described above is based upon the reference diameter of 1.65 inches which has been found adequate for ultrasonic systems of up to 1,000 acoustic watts power capability. The diameter $d_x$ for anvils for any power level $P_x$ can be determined from the equation:

$$d_x = 0.29 \sqrt[4]{P_x} \quad (7)$$

Thus, for a 15 kHz welder of 4,000 acoustic watt power capability, the diameter $d_x$ is attained from equation (7) as follows:

$$d_x = 0.29 \sqrt[4]{4,000} = 0.29 \times 7.98 = 2.31 \text{ inches}$$

Hence, from equation (1) for a tool steel reed anvil, wherein $\omega = 9.42 \times 10^4 \text{ sec}^{-1}$; $c_o = 2.04 \times 10^5$ in/sec; $K = 0.578$ in; and $\alpha_2 \cong 9\pi/4$, the length L is approximately 7.92 inches. It should be noted that any of the roots of equation (2) satisfies the requirements; however, more practical length values are achieved for the first four roots, i.e., $\alpha_1 \ldots \alpha_4$.

The following chart summarizes suitable dimensions for the relevant components which have been acoustically determined in accordance with twelve operative embodiments and are for illustrative purposes only. In said chart, L represents the length of anvil reed 10, H represents the height of ring 12 and of mass 18, and $d$ represents their diameters.

| Welder Frequency (kc) | Power (watts) | Anvil Reed 10 | | | | Ring 12 | | | Mass 18 | |
|---|---|---|---|---|---|---|---|---|---|---|
| | | $L_f$ (") | $L_a$ (") | $L_t$ (") | d (") | H (") | d (") | H (") | $d_1$ (") | $d_2$ (") |
| 15 | 1000 | 6.63 | 10.20 | 6.22 | 1.63 | 3 | 4 | 5¾ | 4½ | 4 |
| | 4000 | 7.92 | 10.20 | 6.22 | 2.31 | 3 | 4 | 5¾ | 4½ | 4 |
| 20 | 500 | 7.65 | 4.67 | | 1.37 | 2¼ | 3 | 4 5/16 | 3⅜ | 3 |
| | 1000 | 5.75 | 7.65 | 4.67 | 1.63 | 2¼ | 3 | 4 5/16 | 3⅜ | 3 |

The second root of equations (2), (4) and (6) was used in all cases. Subscripts are as follows: $f = $ flexural mode; $a = $ axial, or longitudinal, mode; $t = $ torsional mode.

The present invention may be embodied in other specific forms without departing from the spirit or essential attributes thereof and may be applied to other vibratory energy delivery systems wherein a reactive member is employed. Accordingly, reference should be made to the appended claims, rather than to the foregoing specifications as indicating the scope of the invention.

We claim:

1. Anvil apparatus comprising an anvil reed free on one end and connected at its other end to a mass, a support for said mass and anvil reed, the length of the anvil reed being substantially defined by:

$$L = \alpha \sqrt{K c_o/\omega}$$

wherein $K$ is the radius of gyration $r/2$ of the anvil reed section where $r$ is the radius of the reed, $\omega$ is the angular frequency $2\pi f$ where $f$ is the operating frequency of the welder, $c_o$ is the longitudinal velocity of sound in the anvil reed, $\alpha$ is one of the roots of the transcendental equation: $\tanh \alpha - \tan \alpha = 0$, and the diameter $d_x$ of the anvil reed is defined by:

$$d_x = 0.29 \sqrt{P_x}$$

wherein $P_x$ is the desired acoustic power level at which the anvil is to be used.

2. Anvil apparatus in accordance with claim 1 including a base ring forming a portion of said mass, said anvil reed being connected at its lower end to said base ring.

3. Anvil apparatus in accordance with claim 1 wherein said mass is acoustically isolated from said support by an elastomeric material.

4. Anvil apparatus comprising an anvil reed free at one end and connected at its other end to a mass, a support for said mass and anvil, said mass being acoustically isolated from said support, the transverse dimension $d_x$ of the anvil being defined by:

$$d_x = 0.29 \sqrt{P_x}$$

wherein $P_x$ is the desired acoustic power level at which the anvil is to be used.

5. Anvil apparatus is accordance with claim 4 wherein said anvil is induced to respond in the flexural mode so that the length of the anvil is defined by:

$$L = \alpha \sqrt{K c_o/\omega}$$

where $L$ is length of anvil in inches, $K$ is the radius of gyration $r/2$ of the anvil reed section where $r$ is the radius, $\omega$ is the angular frequency $2\pi f$ and $f$ is the operating frequency of the welder, $c_o$ is the velocity of sound in the anvil, $\alpha$ is one of the roots of the transcendental equation: $\tanh\alpha - \tan\alpha = 0$.

6. Anvil apparatus in accordance with claim 4 wherein said anvil is induced to respond in the axial, or longitudinal, mode so that the length of the anvil is defined by:

$$L = \alpha c_o/\omega$$

where $L$ is the length of anvil in inches, $c_o$ is the longitudinal velocity of sound in the anvil, $\omega$ is the angular frequency $2\pi f$ and $f$ is the operating frequency of the welder, and $\alpha$ is one of the roots of the transcendental equation: $\cot\alpha = 0$.

7. Anvil apparatus in accordance with claim 4 wherein said anvil is induced to respond in a torsional mode so that the length of the anvil is defined by:

$$L = \alpha(c_{shear}/\omega)$$

where $L$ is length of anvil in inches, $\omega$ is angular velocity $2\pi f$ and $f$ is the operating frequency of the welder, $c_{shear}$ is the shear velocity of sound in the anvil, and $\alpha$ is one of the roots of the transcendental equation: $\cot\alpha = 0$.

8. Anvil apparatus in accordance with claim 4 wherein said anvil reed is connected to the mass by means of an annular base, the base being bolted to the mass, the anvil reed extending through a central bore in the base, said anvil reed being metallurgically bonded to said base.

* * * * *